United States Patent [19]

Steinmetz et al.

[11] Patent Number: 4,986,724
[45] Date of Patent: Jan. 22, 1991

[54] SYSTEM FOR COMPENSATED MOTION OF COUPLED ROBOT AXES

[75] Inventors: Michael A. Steinmetz, Greenwood, S.C.; David E. Lintner, Westchester, Ohio

[73] Assignee: Cincinnati Milacron Inc., Cincinnati, Ohio

[21] Appl. No.: 307,194

[22] Filed: Feb. 3, 1989

Related U.S. Application Data

[63] Continuation of Ser. No. 119,192, Nov. 10, 1987, abandoned.

[51] Int. Cl.⁵ ............................................... B25J 9/00
[52] U.S. Cl. .................................... 414/729; 414/917; 414/786; 901/9; 901/23; 901/46
[58] Field of Search ................................ 414/729, 786

[56] References Cited

U.S. PATENT DOCUMENTS

| | | |
|---|---|---|
| 3,906,323 | 9/1975 | Ono et al. |
| 4,076,131 | 2/1978 | Dahlstrom et al. ............ 901/46 X |
| 4,140,953 | 2/1979 | Dunne ............................ 901/5 X |
| 4,298,308 | 11/1981 | Richter .......................... 364/513 X |
| 4,488,242 | 12/1984 | Tabata et al. ..................... 364/513 |
| 4,578,627 | 3/1986 | Dröscher et al. ................. 318/632 |

FOREIGN PATENT DOCUMENTS

| | | |
|---|---|---|
| 2402829 | 8/1974 | Fed. Rep. of Germany .......... 901/9 |
| WO85/03663 | 8/1985 | PCT Int'l Appl. .................. 901/15 |

Primary Examiner—Frank E. Werner
Assistant Examiner—William M. Hienz
Attorney, Agent, or Firm—Frost & Jacobs

[57] ABSTRACT

A system for accurately and smoothly moving the tool centerpoint of a manipulator device. The system includes means for measuring the angles at the elbow pivot joint and shoulder pivot joint of the manipulator device. Required compensating movement in a second axis of the manipulator linkage as a result of movement in a first axis thereof is anticipated by the control system to enable substantially simultaneous movement of both axes, and feedback of the angular position of the pivot joints during such movements enables enhancement of the precision of the tool centerpoint movement.

16 Claims, 4 Drawing Sheets

SYSTEM FOR COMPENSATED MOTION OF COUPLED ROBOT AXES

BACKGROUND OF THE INVENTION

This invention relates generally to a system for the positioning of a robot arm and, in particular, to a novel system for accurately positioning one member of a robot by compensating for any positioning change of another member which is mechanically coupled to that member.

Industrial robots have been used increasingly over the years in many varied types of manufacturing applications. The positioning accuracy provided by an industrial robot enhances its use in many high precision manufacturing operations, such as, for example, welding.

Prior art robotic devices have generally used precision positioning devices such as ball screws and precision measuring devices such as resolvers to achieve the high accuracy necessary for operation. The resolver is usually mechanically coupled to a servo motor which drives the ball screw so that when a particular position is desired, the control system calculates at what exact position each ball screw must be located for each axis to achieve the desired position. This is a very complex task, as the robot is usually comprised of a multi-axis joint system having several mechanical linkages. This linkage system may introduce various errors, such as the temperature effects or physical wear on mechanical parts, into the positioning of the robot which may not be detected by this ball screw/resolver arrangement.

Often this error can be compensated for in the programming of the control system or processor which calculates the final position desired by the ball screw for each axis. However, this solution may involve very complex mathematical processing to calculate the exact position for the robot arm as it is traveling along the programmed path, and the error compensation may be based on estimates that prove unsatisfactory.

To avoid the drawbacks associated with measuring devices located adjacent the drive motors, it is preferable to mount the measuring device at the machine joint. Direct measurement of position at the mechanical joint is satisfactory provided the measured position is not affected by motion of other machine members. However, where mechanical coupling between several machine members results in two or more independently controlled driving motors affecting the measured position of a single joint, direct measurement of position has not heretofore been used.

Consequently, heretofore there has not been available in the industry a reliable, relatively simple robot arm positioning system which efficiently and precisely insured accurate positioning for both mechanically coupled and independent machine axes.

SUMMARY OF THE INVENTION

It is therefore an object of the present invention to provide a novel system for the precise positioning of the arm of an industrial robot.

It is a further object of the present invention to provide compensation for servomechanisms of mechanically coupled members of a manipulator wherein the machine member positions are measured at the machine joints.

It is a still further object of the present invention to provide compensation for servomechanisms of mechanically coupled members of a manipulator without alteration of the process of generation of position commands by the motion control algorithm.

It is still further object of the present invention to provide compensation for a first servomechanism of a mechanically coupled pair of servomechanisms having direct measurement of position wherein the compensation is derived from the following error of the second servomechanism of the pair.

These and other objects of the present invention are accomplished by a novel system for controlling the position of the arm of a robotic manipulator by anticipating in one servomechanism the position error induced by mechanical coupling with another servomechanism. The angles between the links of a four bar linkage system for a robot arm are accurately calculated by physically mounting measurement devices at the joints between the links. Thus, the positioning of the robot arm can be accurate as a function of the position of link angles of the robot structure rather than as a function of the position of the ball screw/servo motor. The mechanical coupling of the linkage is compensated by deriving a compensation signal from the following error of the independent servomechanism and applying the compensation signal to the dependent servomechanism.

DETAILED DESCRIPTION OF THE PREFERRED EMBODIMENT

Figure 1:
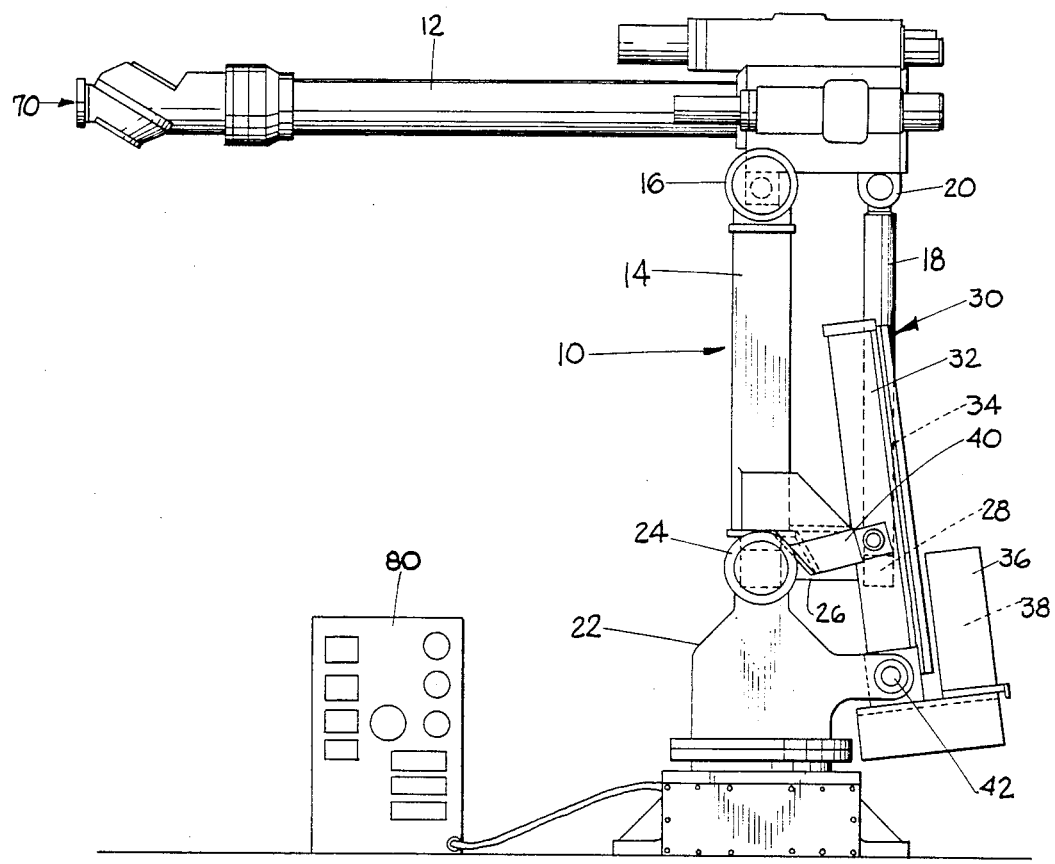
FIG. 1 is a side elevational view of an exemplary robot to which the teaching of the present invention can be applied.

Referring now to the drawings in detail, like numerals indicate the same or similar elements throughout the views.

Figure 2:
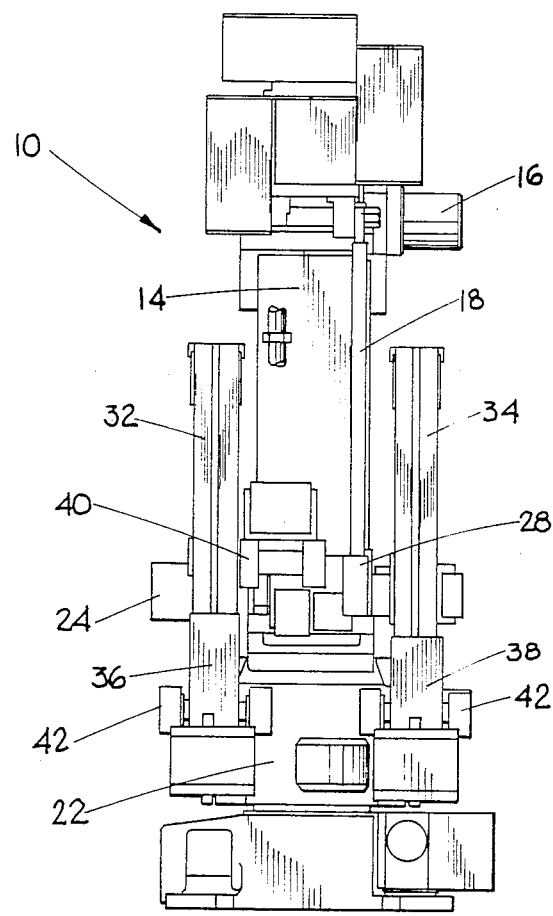
FIG. 2 is a rear elevational view of the robot illustrated in FIG. 1.

Referring first to FIGS. 1 and 2, there is shown a typical industrial robot 10 of the type into which the present invention can be incorporated. A robot forearm 12 is coupled to an upper arm 14 at an elbow pivot joint 16, and is also coupled to a rear link bar 18 at an upper pivot joint 20. Upper arm 14 is coupled to the base 22 of robot 10 at a shoulder pivot joint 24. Also at pivot joint 24, a link bar 26 is rotatably mounted to base 22. Link bar 26 is coupled to rear link bar 18 at a lower pivot joint 28. The mechanical arrangement of forearm 12, upper arm 14, and link bars 18 and 26 comprise a four bar linkage generally designated by the reference 30. It can be appreciated that the four bar linkage arrangement will always take the shape of a parallelogram, as is illustrated best in FIG. 3. As the four bar linkage 30 shifts during operation of robot 10, forearm 12 remains parallel to link bar 26, while arm 14 remains parallel to link bar 18.

Figure 3:
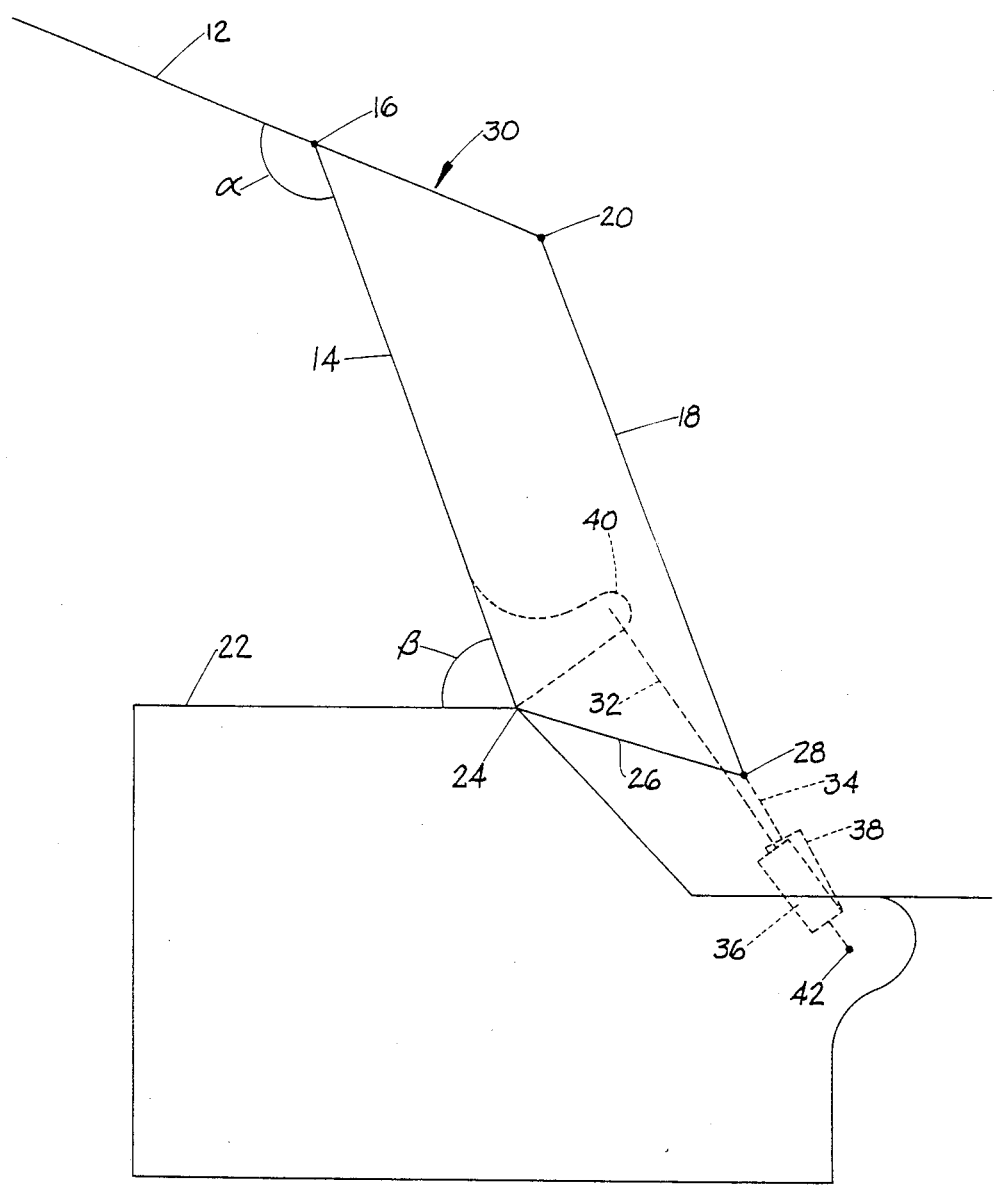
FIG. 3 is a diagrammatic representation of the four bar linkage portion of the robot arm of FIG. 1.

FIG. 3 shows a simplified diagram of the industrial robot of FIGS. 1 and 2. As can be seen in the diagram, the angle between forearm 12 and upper arm 14 is designated as elbow pivot angle $\alpha$, while the angle between upper arm 14 and a horizontal line passing through the center of shoulder pivot joint 24 (such horizontal line being represented by base 22) is designated as shoulder pivot angle $\beta$.

Forearm 12 is located by the positioning of four bar linkage 30. This is accomplished by the action of a pair of precision ball screws 32, 34, which are driven by servo motors 36, 38 respectively. Ball screw 32, which is driven by motor 36, is mechanically coupled by a ball nut (not shown) to a support arm 40, which is affixed to arm 14, while ball screw 38 is supported in a ball nut (not shown) at lower pivot joint 28. The lower ends of ball screws 32 and 34 are supported on bearings (not shown) which are affixed to base 22 through common support 42.

In operation, when forearm 12 is commanded to move, four bar linkage 30 is shifted to a new configuration (which remains a parallelogram) by the action of ball screw 34 driven by servo motor 38. Since shoulder joint pivot 24 is rigidly affixed to base 22, rotation of link 26 results in longitudinal movement of link 18. The action of ball screw 32 causes upper arm 14 of four bar linkage 30 to rotate around shoulder joint pivot 24, thus moving pivot point 16 and causing the elbow pivot angle $\alpha$ to change, thereby affecting both pivot angles $\alpha$ and $\beta$. The action of ball screw 34 on lower pivot joint 28 causes four bar linkage 30 to change angle $\alpha$ independently without affecting shoulder angle $\beta$.

During many manufacturing operations, it is necessary to move tool center point 70 of forearm 12 continuously along a straight line or along a predetermined arcuate path. To accomplish this type of movement, changes in shoulder pivot angle $\beta$ and changes in elbow angle $\alpha$ must be correspondingly determined for intermediate points along the path. As angle $\beta$ is changed by the action of ball screw 32, ball screw 34 must also be activated in order to maintain a particular desired elbow angle $\alpha$. Although a separate command is not generated to change elbow angle $\alpha$ when only shoulder pivot angle $\beta$ is desired to be changed, an elbow servomechanism position loop LE in the control system of robot 10 forces elbow angle $\alpha$ to remain constant by causing ball screw 34 to compensate for changes in elbow angle $\alpha$ caused by the changing of shoulder angle $\beta$.

Because the action of ball screw 34 required to compensate for the induced angular change in elbow angle $\alpha$ can occur only after the change is measured, the combined motions of the mechanically coupled forearm 12 and upper arm 14 result in unacceptable deviations of the tool centerpoint 70 from the desired path. In the prior art, positions of mechanically coupled members were measured at the drive motors to avoid the control difficulty introduced by measuring position at the joints. As previously stated, these prior art measurement techniques had many deficiencies and inherent inaccuracies. It is therefore desirable to retain the direct measurement of position and eliminate the lag in the change of elbow angle $\alpha$ by anticipating the change induced by changes in shoulder angle $\beta$.

By compensating the servomechanism of elbow angle $\alpha$ for an anticipated change induced by a change in shoulder angle $\beta$ at the same time that the shoulder angle $\beta$ is commanded, the overall dynamic response of the system is improved and better maintained. In the present invention resolvers are mounted at elbow pivot joint 16 and shoulder pivot joint 24 to accurately measure elbow angle $\alpha$ and shoulder angle $\beta$, respectively, and are mechanically coupled to measure rotations of forearm 12 and upper arm 14. The actual coupling of such resolvers can be accomplished in a manner well known in the art. The compensation for the elbow angle servomechanism position loop is derived from the following error of the shoulder angle servomechanism position loop.

Figure 4:
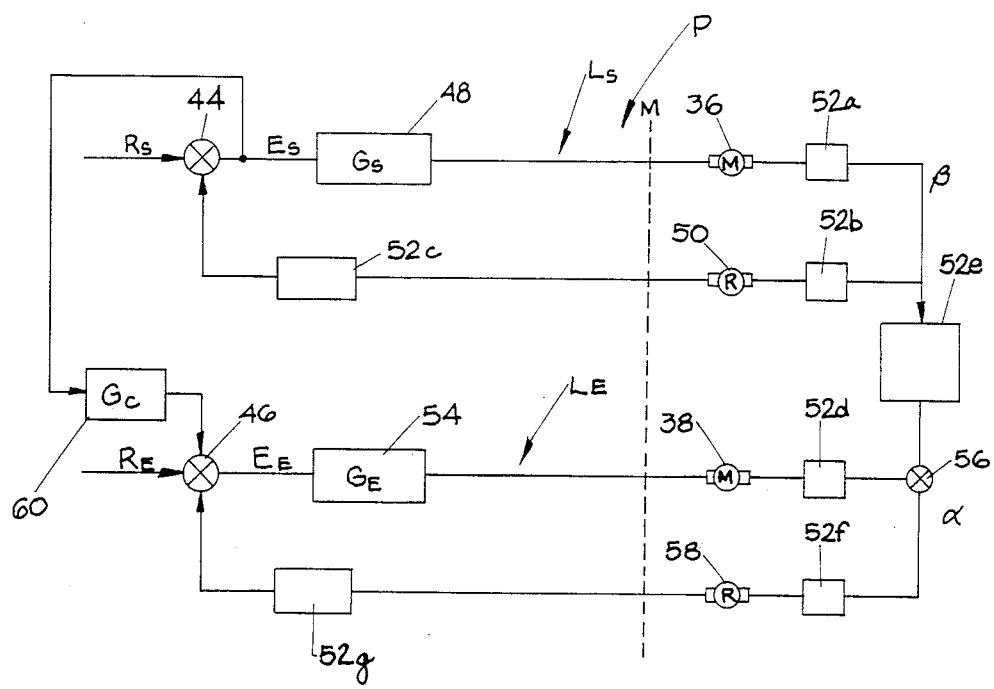
FIG. 4 is a block diagram of a preferred embodiment of the servomechanisms of the coupled members of the four bar linkage.

The coupled position loop P for controlling the movement of elbow pivot joint 16 and shoulder pivot joint 4 in accordance with the present invention is illustrated schematically in FIG. 4 as including shoulder command loop $L_S$ and elbow position loop $L_E$. In this figure, elements to the right of dashed line M represent mechanical elements of each servomechanism. As tool centerpoint 70 is commanded to move to a selected position, command signal $R_S$ for controlling the shoulder angle $\beta$ is transmitted to a signal summing point or comparator 44, while command signal $R_E$ for controlling the elbow angle $\alpha$ is transmitted to a signal summing point or comparator 46. The output of comparator 44 comprises shoulder error signal $E_S$, while the output of comparator 46 comprises elbow error signal $E_E$.

Error signal $E_S$ from comparator 44 is then transmitted to an amplifier 48, which amplifier has a gain of $G_S$. The output of amplifier 48 is connected to servo motor 36, the action of which causes the shoulder resolver 50 to rotate. The output of motor 36 is modified by gearing or transmission equipment represented by transfer functions 52a and 52b. Specific details of transfer functions 52a and 52b will, of course, depend on the particular mechanical characteristics of the type of industrial robot in use. Finally, the output of shoulder resolver 50 (i.e., resolver rotor position of resolver 50 converted to a position signal by transfer function 52c is connected in a feedback loop to summing point comparator 44.

Elbow position loop $L_E$ operates in a manner similar to the shoulder command loop $L_S$, as error signal $E_E$ from comparator 46 is transmitted to servo motor 38 via an amplifier 54, which amplifier has a gain of $G_E$. The output of motor 38 is modified by gearing or transmission equipment represented by a transfer function 52d and transmitted to a mechanical summing point 56.

At mechanical summing point 56, the modified output of motor 38 is summed with the modified output of motor 36 from loop $L_S$, with such output of motor 36 being first further modified by a transfer function 52e representing mechanical coupling between the two axes.

The output of mechanical summing point 56 causes rotation of the elbow resolver 58, which is further modified by a transfer function 52f representing gearing or transmission equipment connected to the resolver rotor. The resultant resolver signal (i.e., resolver rotor position of resolver 58 converted to a position signal by transfer function 52g) is then sent back to comparator 46.

To compensate for the coupling between elbow joint 16 and shoulder joint 24, error signal $E_S$ is fed through a transfer function 60 having a gain of $G_C$ to summing point comparator 46.

In operation, when tool centerpoint 70 is commanded to move to a particular position, control signals $R_S$ and $R_E$ (which are indicative of that absolute position of upper arm 14 and forearm 12) are transmitted from a robot control means 80 to comparators 44 and 46 respectively. The output of comparator 44 (error signal $E_S$) is transmitted to shoulder motor 36, and is also fed back to comparator 46, causing elbow motor 38 to anticipate the movement of shoulder joint 24. As motor 38 responds to these signals, the mechanical summing point receives mechanical displacements from shoulder motor 36 and elbow motor 38. The movement of motors 36 and 38 generates a feedback signal from resolvers 50 and 58 respectively to update error signals $E_S$ and $E_E$. This process continues until both joints 16 and 24 have reached their commanded position. It should be understood that coupled position loop P is shown and described only as an exemplary embodiment of the subject invention, and that the exact components and arrangement of this loop might vary between particular applications depending on variables such as ball screw structure, resolvers utilized, robot control system peculiarities, servo motor characteristics, and the like.

The primary advantage of this invention is that, by generating a command signal to the elbow joint (e.g. 16) and using feedback from the shoulder joint error signal, it is possible to anticipate movement of the linkages of the robot, rather than react to movement by the shoulder joint; thus providing for smooth and more precise motion in the positioning of the robot arm during operation.

While the invention has been shown and described in terms of a preferred embodiment thereof, it will be understood that this invention is not limited to this particular embodiment and that many changes and modifications may be made without departing from the true spirit and scope of the invention as defined in the appended claims.

What is claimed is:

1. Apparatus for controlling a manipulator to effect motion of a tool centerpoint, the manipulator including a first rotating member, first drive means for effecting rotation of the first member, a second rotating member and a second drive means for effecting rotation of the second member, the first and second members being mechanically coupled such that absent counter action by the second drive means, rotation of the first member by the first drive means effects rotation of the second member relative to the first member, the apparatus comprising:
    (a) control means commanding a location of the tool centerpoint;
    (b) first measuring means responsive to actual rotation of the first member relative to a reference for measuring rotation of the first member relative to the reference;
    (c) second measuring means responsive to actual rotation of the second member relative to the first member for measuring rotation of the second member relative to the first member, the second measuring means measuring the rotation of the second member caused by the mechanical coupling of rotation of the first member;
    (d) first servomechanism means responsive to the control means and the first measuring means for producing a first error signal for controlling the first drive means; and
    (e) second servomechanism means responsive to the control means, the second measuring means, and the first error signal for producing a second error signal for controlling the second drive means to counteract the rotation of the second member caused by the coupled rotation of the first member.

2. The apparatus of claim 1 further comprising a transfer function means supplying the first error signal to the second servomechanism means, the transfer function means compensating the first error signal in accordance with the mechanical coupling of the first member to the second member.

3. The apparatus of claim 2 wherein the control means further comprises means for producing first control signals representing a desired rotation of the first member and second control signals representing a desired rotation of the second member, the first and second control signals being defined by a desired position of the tool centerpoint.

4. The apparatus of claim 3 wherein the first measuring means further comprises means for producing a first position signal representing the actual rotation of the first member relative to the reference.

5. The apparatus of claim 4 wherein the first servomechanism means further comprises a first comparator responsive to the first control signal and the first position signal for producing the first error signal.

6. The apparatus of claim 3 wherein the second measuring means further comprises means for producing a second position signal representing an actual rotation of the second member relative to the first member.

7. The apparatus of claim 6 wherein the second servomechanism means further comprises a second comparator responsive to the first error signal as compensated by the transfer function means, the second control signal, and the second position signal for producing the second error signal.

8. Apparatus for controlling a manipulator to effect motion of a tool centerpoint, the manipulator including an upper arm pivotally mounted on a base at a first pivot, a forearm pivotally mounted on the upper arm, a first link pivotally connected to the base at the first pivot, a second link pivotally connected to the first link and pivotally connected to the forearm, the upper arm, forearm, first link, and second link defining a four bar link mechanism, a first drive means for effecting rotation of the upper arm, and second drive means for effecting rotation of the first link, the apparatus comprising:
    (a) control means for commanding a position of the tool centerpoint;
    (b) first measuring means responsive to actual rotation of the upper arm relative to the base for measuring rotation of the upper arm relative to the base;
    (c) second measuring means responsive to actual rotation of the forearm relative to the upper arm for measuring rotation of the forearm relative to the upper arm, the second measuring means measuring rotation of the forearm caused by the mechanically coupled rotation of the upper arm;
    (d) first servomechanism means responsive to the control means and the first measuring means for producing a first error signal for controlling the first drive means; and
    (e) second servomechanism means responsive to the control means, the first error signal and the second measuring means for producing a second error signal for controlling the second drive means to counteract the rotation of the forearm caused by coupled rotation of the upper arm.

9. The apparatus of claim 8 further comprising a transfer function means supplying the first error signal to the second servomechanism means, the transfer function means compensating the first error signal in accordance with mechanism coupling between the upper arm and forearm of the four-bar linked mechanism.

10. The apparatus of claim 9 wherein the control means further comprises means for producing first control signals representing a desired rotation of the upper arm and second control signals representing a desired rotation of the forearm, the first and second control signals being defined by a desired position of the tool centerpoint.

11. The apparatus of claim 10 wherein the first measuring means further comprises means for producing a first position signal representing an actual rotation of the upper arm relative to the reference.

12. The apparatus of claim 11 wherein the first servomechanism means further comprises a first comparator responsive to the first control signals and the first position signal for producing the first error signal.

13. The apparatus of claim 10 wherein the second measuring means further comprises means for producing a second position signal representing an actual rotation of the forearm relative to the upper arm.

14. The apparatus of claim 13 wherein the second servomechanism means further comprises a second comparator responsive to the first error signal as compensated by the transfer function means, the second control signals, and the second position signal for producing the second error signal.

15. Method for controlling a manipulator to effect motion of a tool centerpoint, the manipulator including two rotating members which are mechanically coupled such that rotation of a first member effects rotation of a second member relative to the first member, first drive means for effecting rotation of the first member, and second drive means for effecting rotation of the second member, the first drive means being responsive to a first servomechanism means and the second drive means being responsive to a second servomechanism means, the method comprising the step of:

(a) producing first control signals representing a desired rotation of the first member defined by a desired position of the tool centerpoint;
(b) producing second control signals representing a desired rotation of the second member defined by a desired position of the tool centerpoint;
(c) producing in response to actual rotation of the first member a first position signal representing the actual rotation of the first member relative to a reference;
(d) producing in response to actual rotation of the second member relative to the first member a second position signal representing the actual rotation of the second member relative to the first member, the second position signal representing rotation of the second member caused by the coupled rotation of the first member;
(e) producing a first error signal in response to the first control signal and the first position signal, the first error signal controlling the first drive means; and
(f) producing a second error signal in response to the first error signal, the second control signal, and the second position signal, the second error signal controlling the second drive means to counteract the rotation of the second member relative to the first member resulting from the coupled rotation of the first member.

16. The method according to claim 15 further comprising a step of compensating the first error signal as used to produce the second error signal, the compensation accounting for the mechanism coupling of the first member to the second member.

* * * * *

UNITED STATES PATENT AND TRADEMARK OFFICE
CERTIFICATE OF CORRECTION

PATENT NO. : 4,986,724

DATED : January 22, 1991

INVENTOR(S) : Michael A. Steinmetz and David E. Lintner

It is certified that error appears in the above-identified patent and that said Letters Patent is hereby corrected as shown below:

Claim 1 - Line 33 - Column 5 - "a" should be deleted

Claim 9 - Line 64 - Column 6 - "mechanism" should read -mechanical-

Claim 16 - Line 32 - Column 8 - "mechanism" should read -mechanical-

Signed and Sealed this

Sixteenth Day of June, 1992

*Attest:*

DOUGLAS B. COMER

*Attesting Officer*     *Acting Commissioner of Patents and Trademarks*